United States Patent [19]

Subramanian et al.

[11] Patent Number: 5,179,060
[45] Date of Patent: Jan. 12, 1993

[54] DISPERSION ENHANCED PT GROUP METAL CATALYSTS AND METHOD OF MAKING THE CATALYSTS

[75] Inventors: Somasundaram Subramanian, Melvindale, Mich.; William L. H. Watkins, Toledo, Ohio; Mohinder S. Chattha, Northville, Mich.

[73] Assignee: Ford Motor Company, Dearborn, Mich.

[21] Appl. No.: 620,514

[22] Filed: Nov. 28, 1990

[51] Int. Cl.$^5$ .................... B01J 21/04; B01J 23/40
[52] U.S. Cl. ............................ 502/332; 502/333; 502/334; 502/506; 502/512; 423/213.5
[58] Field of Search ............... 502/332, 333, 334, 506, 502/512; 423/213.5

[56] References Cited

U.S. PATENT DOCUMENTS

| | | | |
|---|---|---|---|
| 4,171,287 | 10/1979 | Keith | 502/324 X |
| 4,492,769 | 1/1985 | Blanchard et al. | 502/333 X |
| 4,678,770 | 7/1987 | Wan et al. | 502/302 X |

OTHER PUBLICATIONS

Yao et al, "Surface Interactions in the Pt/γ-Al2O3 System", Journal of Catalysis, 59 (1979) 365-374.
Yao et al, "Interactions of Base of Noble Metals with Insulator Supports", Metal-Support and Metal Additive Effects in Catalysis, (B. Imelik et al, Eds) (1982) 159-169.
Huang et al, "The Effect of Solution Variables on Metal Weight Loading During Catalyst Preparation", Applied Catalysis, (1966) 241-248.

*Primary Examiner*—W. J. Shine
*Attorney, Agent, or Firm*—Joseph W. Malleck; Roger L. May

[57] ABSTRACT

A method of making a three-way catalyst based on platinum group metals, comprisng: (a) impregnating an alumina substrate with a platinum group metal ion by contacting such substrate with an aqueous solution containing the platinum group metal in an amount of 0.1-5% by weight of alumina substrate and a water soluble acid that forms RCOOH with R being an alkyl or equivalent, said acid being present in an amount of 10-120% by weight of the alumina substrate, the pH of said solution being less than 4.0; and (b) drying and calcining the wetted substrate without sintering said substrate.

The three-way catalyst construction based on platinum group metals has enhanced catalytic activity. It comprises an alumina substrate and a platinum group metal impregnation layer thereover, said impregnation layer being comprised of raft-like particle structures, each having increased metal density resulting from the nesting of both small and large metal particles within a given volume.

5 Claims, 11 Drawing Sheets

TPRd SPECTRUM FOR CATALYST B

DISPERSION ENHANCED PT GROUP METAL CATALYSTS AND METHOD OF MAKING THE CATALYSTS

BACKGROUND OF THE INVENTION

1. Technical Field

This invention relates to the technology of making low-cost and durable three-way platinum group metal catalysts, and more particularly to techniques for improving the dispersion of the precious metal catalyst deposited from an aqueous phase.

2. Discussion of the Prior Art

Most commercial applications of precious metals as catalysts use a procedure that coats a substrate with an aqueous solution containing precious metal salt solutions such as chloroplatinic acid to deposit platinum, or rhodium nitrate to deposit rhodium, or palladium nitrate to deposit palladium. The coated substrate is dried at about 393° K. and then calcined from 650°–900° K. to decompose the salts to their respective metal and/or metal oxide particles. The dispersion distribution for each metal resulting from this procedure can be quantitatively characterized as a benchmark, as measured from the activity of these catalysts in structure sensitive reactions such as oxidation, reduction, and hydrogenolysis.

Techniques which have been used experimentally to vary the dispersion of precious metal catalysts have included (i) use of a different pretreatment procedure, (ii) use of composite oxide, and (iii) use of solution additives which act directly on the metal ion to effect its precipitation or distribution during impregnation.

In the use of a different pretreatment procedure, the deposited precious metal compound is treated at high temperatures to either sinter or redisperse the catalyst. As disclosed in the article by H.C. Yao et al, "Surface Interactions in the Pt/$\gamma$—Al$_2$O$_3$ System", *Journal of Catalysis*, 59 (1979) 365–374, treatment may be carried out under oxidizing or reducing environments. It has been shown in the case of platinum catalysts that the platinum may be dispersed under an oxidizing environment and sintered under a reducing environment. The disadvantage of such a pretreatment procedure is that it is severe and sinters the support, causing catalyst deactivation.

In using a composite oxide, the properties of the catalyst support (typically Al$_2$O$_3$) are modified by depositing additives in the form of a base metal and rare earth oxide. As shown in the article by H.C. Yao et al, "Interactions of Base and Noble Metals with Insulator Supports", *Metal-Support and Metal Additive Effects in Catalysis*. (B. Imelik et al, Eds) (1982) 159–169, dispersion of noble metal on such composite oxide is different from that obtained on pure alumina. The use of the base/rare earth metal oxide could adversely alter the activity of the catalyst.

With respect to using additives to change the solution phase chemistry of the metal ion (as discussed in the article by Y.-J.R. Huang et al, "The Effect of Solution Variables on Metal Weight Loading During Catalyst Preparation", *Applied Catalysis*. (1986) 241–248, salts, such as nitric acid and ammonium hydroxide, have been used to impregnate the metal ion. Such salts affect metal ion precipitation directly; they also are relatively expensive and very cumbersome in use.

It would be desirable if a method could be devised using a solution phase chemistry additive which acts indirectly to improve the dispersion of the platinum group catalyst.

This invention changes the dispersion and particle size distribution of the supported metal at a constant weight loading to achieve improved catalyst activity not obtainable by the prior art. This invention varies the particle size distribution of noble metal catalysts to increase the conversion for propane oxidation or nitric oxide reduction by 3–30%.

SUMMARY OF THE INVENTION

During aqueous impregnation of a platinum group metal onto an alumina substrate, this invention uses an acid to form a platinum group metal/acetate complex and change the pH of the impregnating solution. This results in a larger total amount of platinum group metal present on the alumina surface with enhanced presence of both small and large metal and/or metal oxide particles providing optimum crystal size distribution.

More specifically, a first aspect of this invention is a method of making a three-way catalyst based on platinum group metals, comprising: (a) impregnating an alumina substrate with a Platinum group metal ion by contacting such substrate with an aqueous solution containing the platinum group metal in an amount of 0.1–5% by weight of alumina substrate and a water soluble acid, RCOOH, with R being an alkyl, aryl or equivalent, said acid being present in an amount of 10–120% by weight of alumina substrate, the pH of said solution being less than 4; and (b) drying and calcining the wetted substrate without sintering said substrate.

The second aspect of this invention is a three-way catalyst construction based on platinum group metals having enhanced catalytic activity, comprising: (a) an alumina substrate; and (b) a platinum group metal impregnation layer thereover.

A third aspect of this invention is a method of treating a stream of exhaust gas from an internal combustion engine containing one or more of CO, NO$_x$, and HC, said stream having a space velocity of about 30 Khr$^{-1}$ and a temperature within the range of 100°–1000° C., the method comprises exposing the stream to a platinum group metal three-way catalyst comprised of an alumina substrate, a platinum group metal impregnation layer over said substrate, and facilitated by the presence of both small and large metal particles within a given volume, said catalyst promoting a light-off temperature for methane oxidation which is no greater than 600° C., for propane oxidation no greater than 400° C., and a nitric oxide reduction no greater than 200° C.

Hydrocarbon oxidation efficiency is increased by at least 10% at 580° C., propane oxidation efficiency is increased by at least 5% at 500° C., and NO$_x$ reduction efficiency is increased by at least 3–5% at 250°–600° C.

The method of making the catalyst requires dry impregnation, incipient wetness, or wet impregnation. Incipient wetness is used herein to mean that amount of aqueous solution sufficient to wet the support surface with no excess solution thereon.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction wit the accompanying drawings, in which:

DETAILED DESCRIPTION AND BEST MODE

The dispersion of a $Pd/Al_2O_3$ catalyst was enhanced by changing the solution phase speciation with acetic acid or its equivalent. Acetic acid or equivalent water soluble acids (i) have the potential to complex with a platinum group metal to form a precipitate, (ii) change the pH of the impregnation solution, and (iii) promote agglomeration. Examples of such equivalent acids are benzoic, propionic, and butyric.

Figure 1:
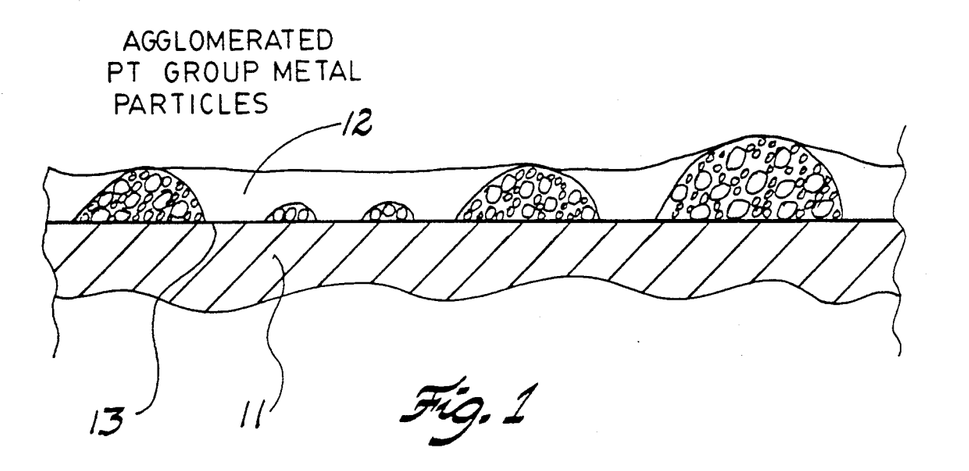
FIG. 1 is a representation of a transmission electron microscopy view of the surface of a platinum group metal catalyst prepared in accordance with this invention, the TEM results show that the acetic acid modified catalyst contains two types of particles: raft-like agglomerate of PdO particles and highly dispersed PdO particles, the catalyst Prepared from Pd nitrate contains highly dispersed PdO particles and small hemispherical PdO particles.

As shown in FIG. 1, the three-way catalyst employing this invention, and therefore having enhanced catalytic activity, comprises an alumina substrate 11, a platinum group metal impregnation layer 12 thereover.

Figure 2:
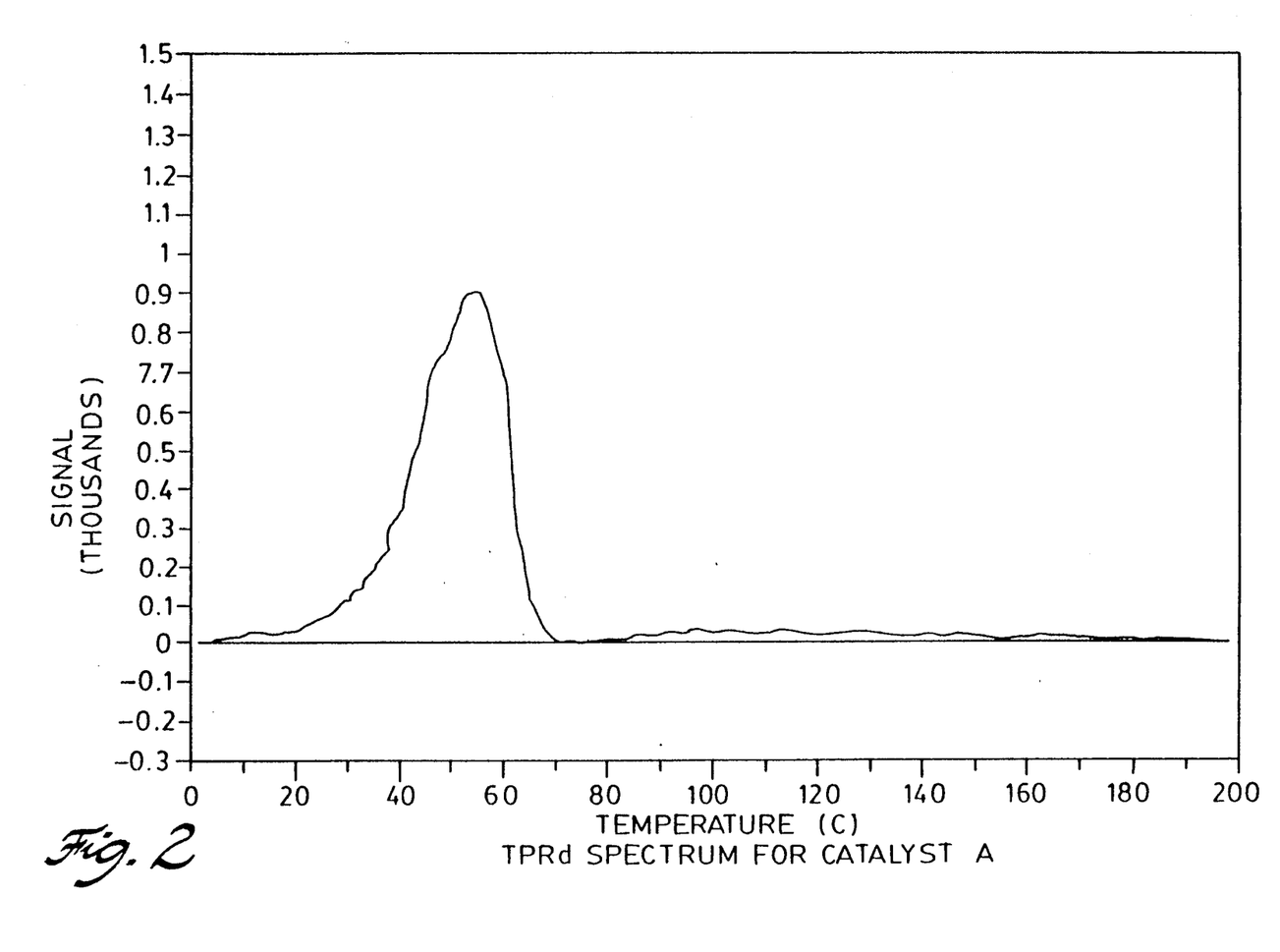
FIGS. 2-3 are graphical illustrations of TPRd signal strength as a function of temperature for catalysts A and B, respectively.
Figure 3:
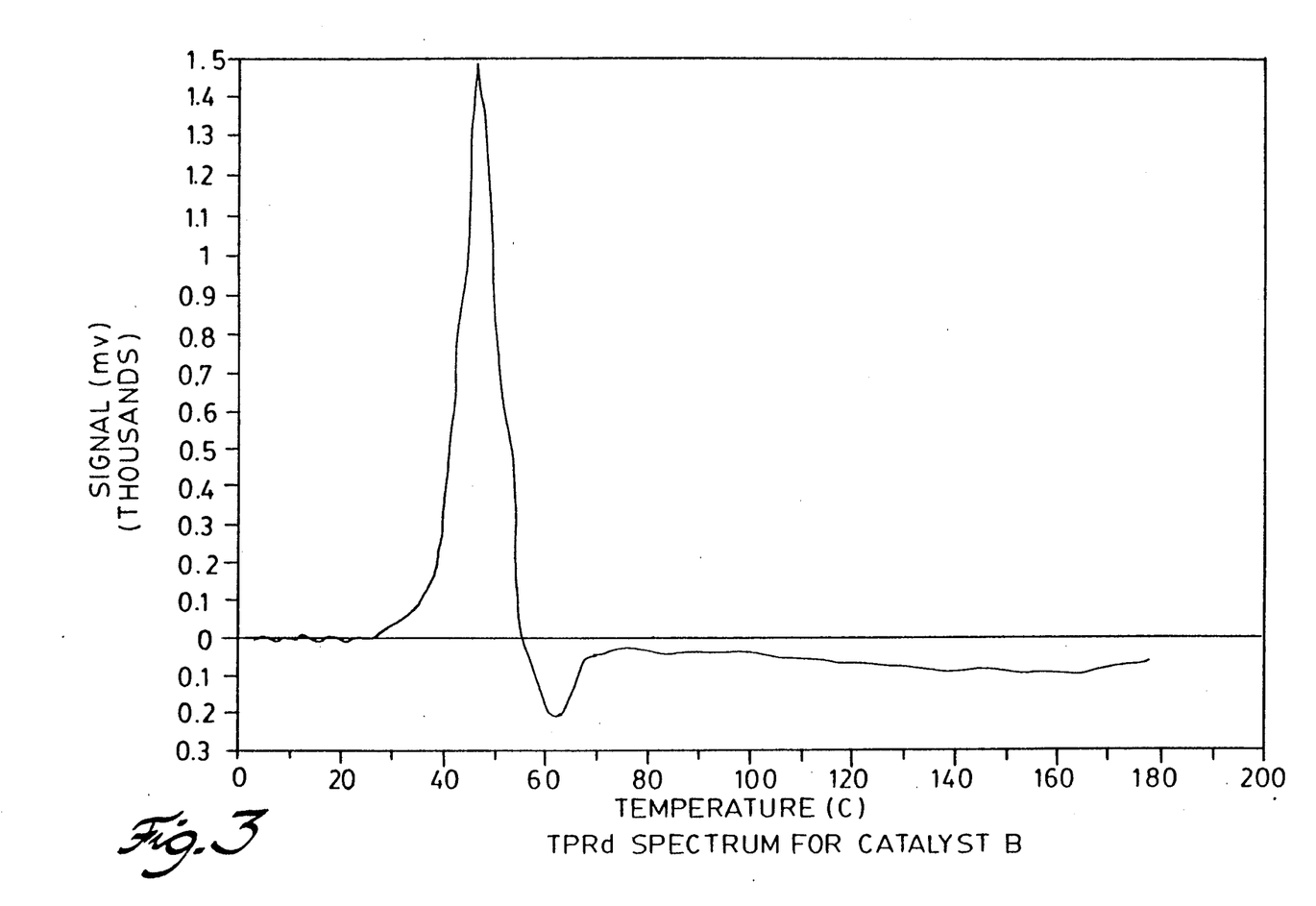

The platinum group metals are selected from the group consisting of platinum, palladium, rhodium, iridium, and ruthenium. The dispersion of the platinum group metals was characterized by temperature-programmed reduction (TPRd) and transmission electron microscopy (TEM). The TPRd results for a sample A prepared in accordance with this invention and a sample B prepared according to the prior art are shown in FIGS. 2 and 3 respectively. It is observed that the reduction peak observed for catalyst B is sharper than that observed for catalyst A. This shows that the crystallite size distribution for catalyst B must be narrower compared to that present in catalyst A. The TEM studies show that some of the particles in catalyst A have a raft-like structure compared to the hemispherical particles deposited by the prior art of FIG. 3. Thus, impregnation layer 12 has a wider particle size distribution and it consists of small and large particles nested together in a given volume when compared to the prior art distributions.

Acetic acid not only lowers the pH of the impregnation solution, but also forms a noble metal acetate complex. The noble metal complex is non-polar in nature compared to the polar palladium nitrate. Therefore, the metal complex precipitates more readily on the alumina substrate and this leads to a change in the : metal architecture with increased reaction of noble metal on the surface layer. The catalysts of this invention, when compared to prior art three-way catalysts, provide a hydrocarbon oxidation efficiency which is increased at least 10% at 580° C., a carbon monoxide oxidation efficiency increase of at least 5% at 500° C., and a nitric oxide reduction efficiency increased by 3-5% at 250°-600° C.

The acids that are operable for purposes of this invention are monocarboxylic, such as acetic acid or equivalents, which provide controlled or limited complexing with platinum group metals and therefore will not form polymeric structures or large blobs of metal while other portions of the substrate remain uncoated Members of this acetic acid equivalent group may include benzoic, propionic, and butyric acid. The acid group may be represented by R—COOH, where R is an alkyl, aryl, or hydroxy substituted alkyl or aryl.

The method of making such three-way catalyst, comprises: (a) impregnating the alumina substrate 11 by incipient wetness with a platinum group metal ion by contacting such substrate with an aqueous solution containing the platinum group metal in an amount of 0.1-5% (preferably (−3%) by weight of alumina substrate and a water soluble acid RCOOH with aryl, substituted alkyl or substituted aryl, said acid being present in an amount of 10-20% by weight of the alumina substrate, the pH of the impregnation solution being less than 4.0; and (b) drying (i.e., 373° K. for one hour) and calcining the impregnated substrate (i.e., 873° K. for 12 hours) to form a coated assembly that does not have the substrate sintered. The ratio of grams of acid to grams of metal can range from 10-500, but is optimum for Pd at 42-83, for Pt at about 121, and for Rh at about 222. The interaction of the acetic acid produces a platinum group metal acetate in the form of $(CH_3COO)_2M$, where M is the platinum group metal.

Preferably, the solution is prepared by dissolving a noble metal salt such as palladium nitrate in water containing nitric acid, with the palladium nitrate present in an amount of about 0.0835 grams of Palladium per cc of water; this is diluted in a 50/50 (volume base) mixture of glacial acetic acid and deionized water. The resulting solution will have a platinum group metal concentration of about 0.0167 g/cc. The desired substrate volume of alumina then is contacted with a small portion of the solution to provide incipient wetness on the surface of the substrate. This typically is carried out by contacting two grams of alumina with 2.4 cc's of solution to obtain a 2% palladium/alumina precursor (a precursor is used herein to mean a catalyst composition that has been dried but not calcined). The complete conversion to the platinum group metal acetate occurs in the absence of nitric acid. In the presence of nitric acid, the produce is contaminated with $PdNO_2.OOCCH_3$.

A method of using such catalyst for treating a stream of exhaust gas from an internal combustion engine containing CO, $NO_x$, and HC, the stream having a space velocity of about 30 $Khr^{-1}$ and a temperature in the range of 100°-1000° C., comprises exposing the stream to a catalyst platinum group metal/alumina combination, the platinum group metal being present in the catalyst in a concentration of 0.1-5% by weight of the alumina substrate, the catalyst having raft-like particle structures. Such catalyst will have an enhanced light-off conversion efficiency when compared to prior art catalysts.

Figure 4:
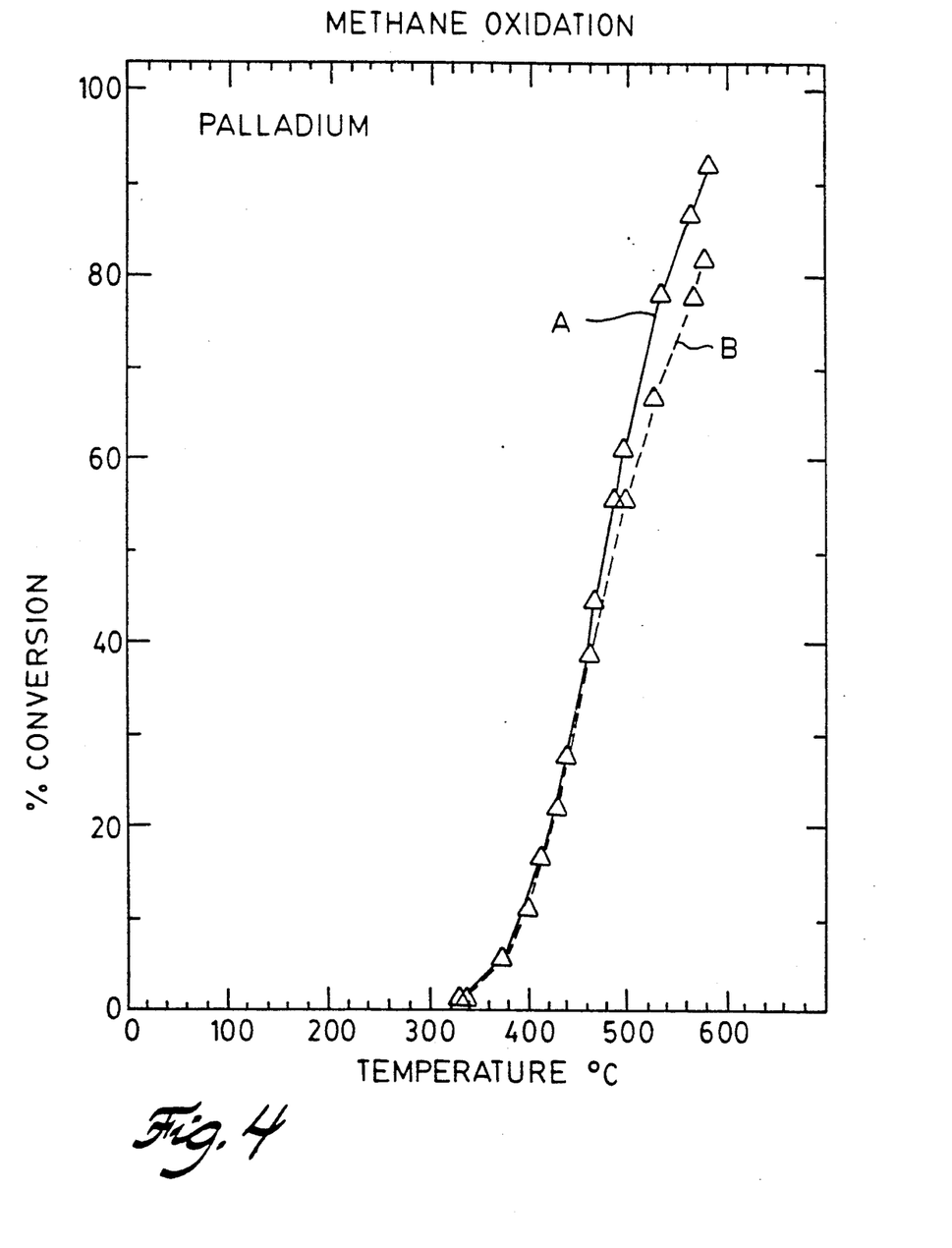
FIG. 4 is a graphical illustration of conversion efficiency as a function of exhaust gas temperature for methane oxidation demonstrating the light-off temperature for a Pd-based catalyst prepared in accordance with this invention.
Figure 5:
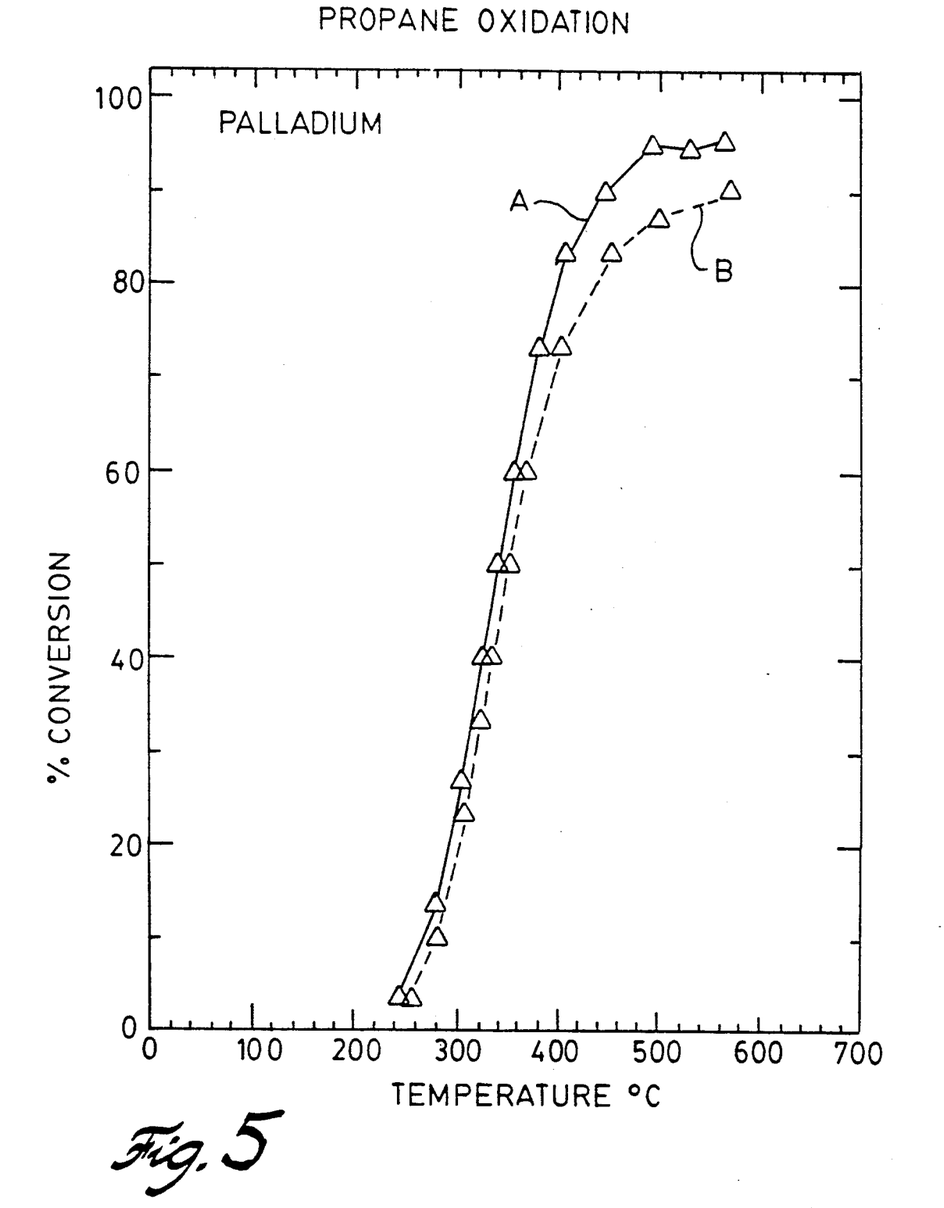
FIGS. 5-6 are graphical illustrations similar to FIG. 1 except the flow reactor contains propane and nitric oxide, respectively.
Figure 6:
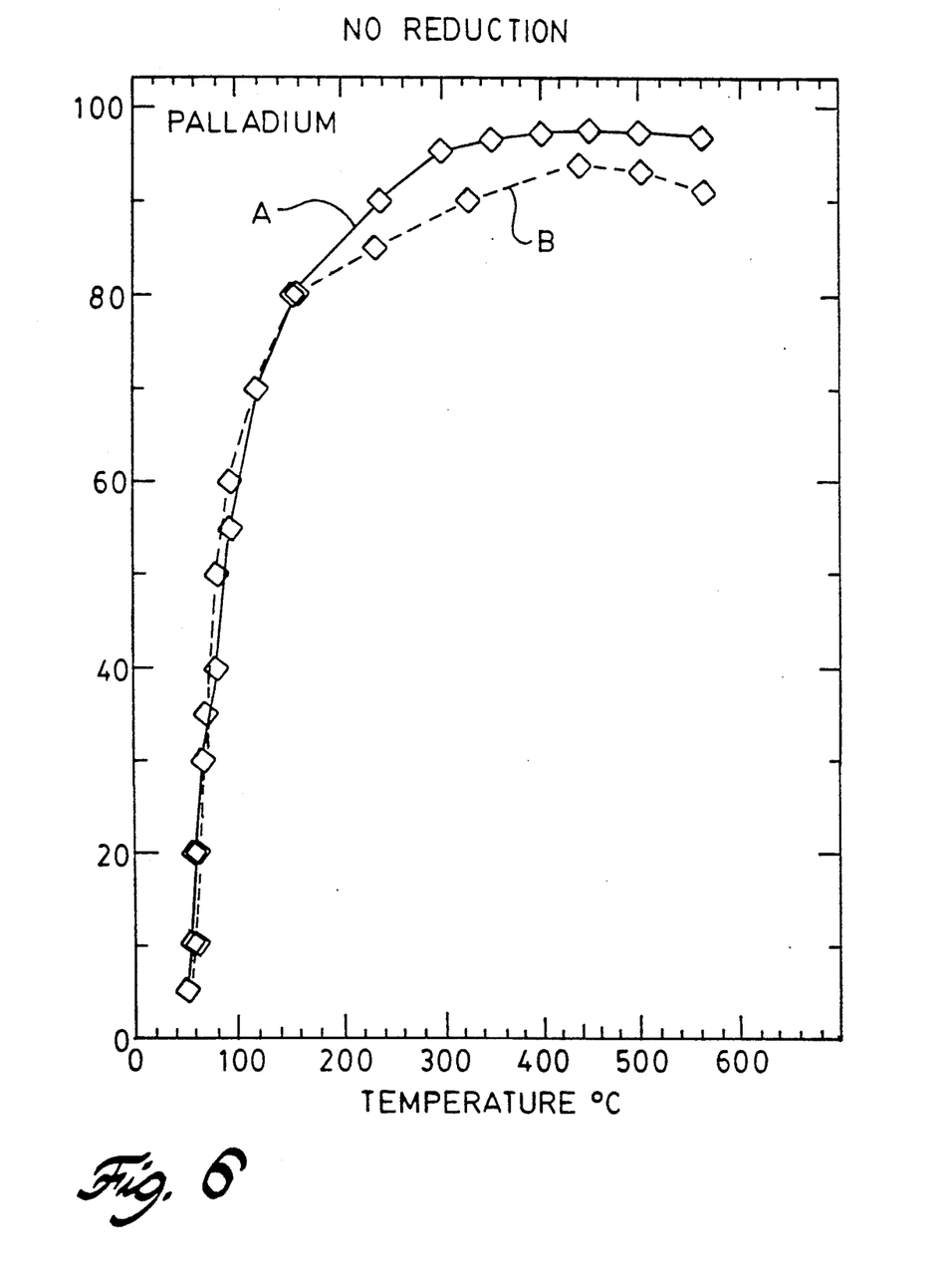

To corroborate the performance of such catalyst, several platinum group metal/alumina catalyst samples were prepared to demonstrate the dramatic difference between a conventionally prepared palladium three-way catalyst and that employing the invention herein. With reference to FIGS. 4-6 (and previously mentioned FIGS. 2-3), two types of palladium/alumina catalysts were prepared. Catalyst A (characteristic of this invention) was prepared by using palladium nitrate solution (0.0835 g/cc) diluted in a 50/50 (volume base) mixture of glacial acetic acid in deionized water. The solution had a palladium concentration of 0.0167 g/cc. Two grams of the alumina were contacted with 2.4 cc of such solution to obtain a 2% palladium/alumina precursor. In catalyst B (characteristic of the prior art), the same palladium nitrate solution (0.0835 g/cc) was diluted in deionized water to obtain a palladium solution of 0.0167 g/cc. Two grams of alumina were contacted with 2.4 cc of such solution to obtain a 2% palladium/alumina precursor. This second catalyst obviously was devoid of any glacial acetic acid. Both precursors were prepared using a single-step impregnation procedure. The precursors were dried at 120° C. and later calcined at 600° C. for 12 hours.

Laboratory flow reactor studies were used to evaluate the activity of catalysts A and B. Methane oxidation (1500 ppm $CH_4$ and 3000 ppm $O_2$), propane oxidation (500 ppm $C_3H_8$ and 20,000 ppm $O_2$), and nitric oxide reduction (1000 ppm NO and 10,000 ppm $H_2$) were used. In addition, redox studies were conducted at 550° C. using the following feed gas composition: 500 ppm hydrocarbons with $C_3H_8$ and $C_3H_6$ in the ratio 1:2, 1000 ppm NO, 15,000 ppm CO, 20 ppm $SO_2$, with $O_2$ concentration varied to produce rich/lean air-fuel mixtures. This mixture was used to simulate the exhaust stream originating from gasoline fueled vehicles. Nitrogen was used as the carrier gas. The conversion results are shown in Table I for samples A and B at varying redox ratios.

TABLE I

| Radox Ratio (R) | Conversions for Catalysts A and B | | | | | |
|---|---|---|---|---|---|---|
| | Hydrocarbon | | Carbon Monoxide | | Nitric Oxide | |
| | A | B | A | B | A | B |
| 0.9 | 73.0 | 56.2 | 81.4 | 62.0 | 23.7 | 19.7 |
| 1.0 | 71.5 | 54.7 | 73.7 | 56.2 | 41.6 | 29.2 |
| 1.1 | 70.4 | 52.6 | 65.7 | 49.6 | 45.3 | 32.8 |
| 1.3 | 66.4 | 50.0 | 46.4 | 37.6 | 40.1 | 32.5 |
| 1.5 | 60.6 | 46.4 | 29.6 | 25.5 | 33.9 | 29.6 |
| 1.7 | 56.9 | 42.0 | 17.2 | 16.4 | 27.7 | 25.5 |

The conversion efficiency curves for methane oxidation, propane oxidation, and nitric oxide reduction are shown respectively in FIGS. 4-6. The sample prepared using acetic acid as a modifier (catalyst A) is significantly more active at 580° C. than the conventional palladium/alumina catalyst (catalyst B). The difference in the activity (92% versus 81% for methane oxidation; 93% versus 90% for propane oxidation; and 97% versus 90% for NO reduction) for these catalysts may be explained in terms of the morphological differences (crystal size distribution and exposed metal surface area). Palladium is partially or totally complexed with acetic acid in the impregnation step and precipitates on the alumina surface in the form of $Pd(OOCCH_3)_2$ or $Pd(OOC-R)_2$, where R is alkyl or aryl group. It may be speculated that the interaction of these precursors with alumina is different than those between palladium nitrate and alumina. The pH of the impregnating solutions of each of the catalysts A and B was different. Dissolution and readsorption of aluminum ions have been observed when alumina is brought into contact with highly acidic solutions similar to those used in this study. The extent of alumina dissolution is a function of pH of the solution with which it is in contact, and it is concluded that the amount of aluminum ions dissolved and reabsorbed is higher in the case of the acid-modified catalyst A. This may also contribute to the differences in the activity and morphology of catalysts A and B.

Figure 7:
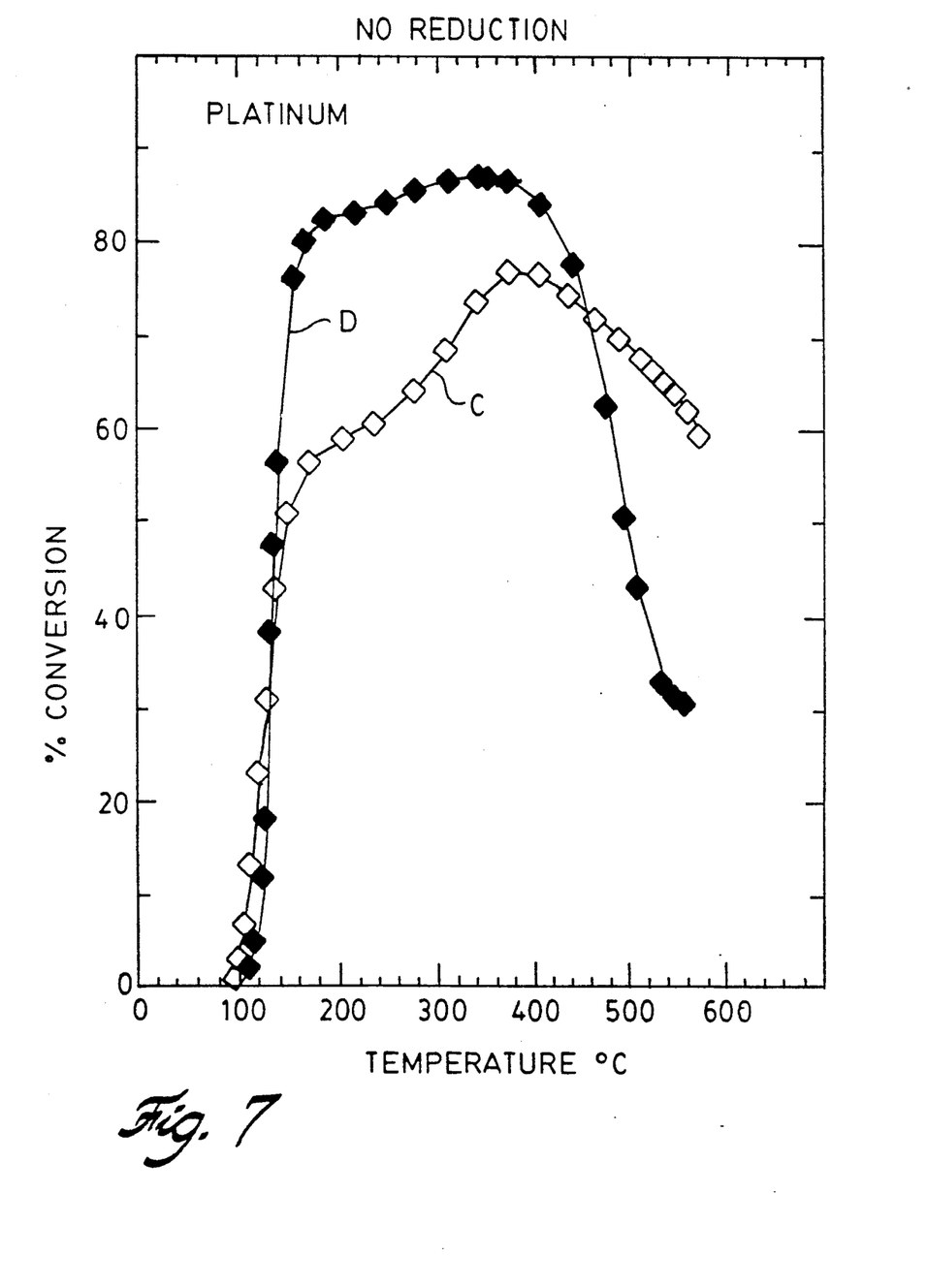
FIG. 7 is a graphical illustration of conversion efficiency as a function of exhaust gas temperature for nitric oxide reduction demonstrating the light-off temperature for a Pt-based catalyst prepared in accordance with this invention.

To corroborate the effect of this invention with platinum, two types of platinum catalysts were prepared. For Catalyst C, chloroplatinic acid was dissolved in water and five grams of alumina were contacted with 6 cc of chloroplatinic acid solution (of desired concentration) to obtain a 2% Pt precursor. For catalyst D, chloroplatinic acid was dissolved in a 50/50 volume ratio) solution of water and acetic acid. Alumina (five grams) were contacted with 6 cc of the chloroplatinic acid in acetic acid/water solution to obtain a 2% Pt precursor. Precursors for catalysts C and D were dried at 393° K. for one hour and later calcined at 873° K. for 12 hours. The resulting catalysts were evaluated on a flow reactor using nitric oxide reduction (0.1% nitric oxide and 1% $H_2$) as the test reaction. A space velocity of 30,000 $hr^{-1}$ was used. The results obtained for nitric oxide reduction are shown in FIG. 7. It is observed that the overall performance (maximum conversion) of catalyst D is superior to that of catalyst C.

Thodium is commonly used in automobile emission control catalysts and is a principal catalytic constituent for nitric oxide (NO) reduction. Rhodium is selective in the reduction of NO by carbon monoxide (CO) under oxidizing conditions. In reducing mixtures, Rh converts NO to $N_2$ with low ammonia formation ($NH_3$); however, Rh is used in a ratio that is significantly greater than the Pt/Rh mine ratio obtained from the raw mine ore. Therefore, it is critical to use Rh most efficiently and to maintain its effectiveness in an automotive exhaust environment.

With $Rh/Al_2O_3$ catalysts, the oxidation of hydrocarbons and reduction of nitric oxide are structure sensitive reactions, where the specific activity of the catalyst is sensitive to the dispersion of the metal species. Moreover, $Rh/Al_2O_3$ catalysts have a problem with diffusion of Rh into $Al_2O_3$ sublayers when these catalysts are exposed to high temperatures under oxidizing conditions. This phenomenon leads to a suppression in the activity of a $Rh/Al_2O_3$ catalyst. This invention has developed a superior $Rh/Al_2O_3$ catalyst by changing the solution phase speciation through the use of glacial acetic acid or its equivalent in the impregnation solution. The activity of the Rh catalysts prepared from acetic acid-modified Rh nitrate is significantly higher than that of the conventional Rh catalysts (prepared from rhodium nitrate) for reactions such as hydrocarbon oxidation and nitric oxide reduction. This trend is also observed under redox conditions. Temperature-programmed reduction studies show that the use of acetic acid leads to a suppression in the fraction of Rh that diffuses under the alumina subsurface layer. Consequently, a larger fraction of Rh is present as crystalline $Rh_2O_3$, a morphological change.

To corroborate the above phenomenon, comparative samples were prepared; gamma-$Al_2O_3$ was agglomerated and the resulting solid was ground to a particle size of 20-40 mesh. Rhodium nitrate and glacial acetic acid were used in precursor preparation.

For catalyst E, rhodium nitrate solution (0.0872 grams of Rh/ml) was diluted in a 50/50 (volume basis) mixture of glacial acetic acid and deionized water. The resulting solution had a Rh concentration of 0.0167 g/ml. Two grams of alumina were contacted with 2.4 ml of the above solution to obtain a 2% $Rh/Al_2O_3$ precursor. It should be noted that in bulk systems, Rh(II) acetate is conventionally synthesized by reacting hydrous rhodium oxide with glacial acid; Rh acetate is probably formed during the drying/calcination steps employed in the preparation of this dispersed, alumina supported precursor.

For catalyst F, rhodium nitrate solution (0.0872 grams of Rh/ml) was diluted in deionized water to obtain a Rh solution of 0.0167 g/ml. Two grams of alumina were contacted with 2.4 ml of this solution to obtain a 2% $Rh/Al_2O_3$ precursor. Both precursors A and B were prepared using a single step impregnation procedure and dried at 120° C. (393° K.) for one hour and later calcined at 600° C. (873° K.) for 12 hours in air.

Propane oxidation (550 ppm $C_3H_8$ and 20,000 ppm $O_2$) and nitric oxide reduction (1000 ppm NO and 10,000 ppm $H_2$) flow reactor studies were used to evaluate the activity of catalysts E and F. In addition, redox studies were conducted at 550° C. using the following feed gas composition: 500 ppm hydrocarbons with $C_3H_8$ and $C_3H_6$ in the ratio 1:2, 1000 ppm NO, 15,000 ppm CO, 20 ppm $SO_2$, with $O_2$ concentration varied to produce rich/lean air-fuel mixtures. This mixture was used to simulate the exhaust stream originating from gasoline fueled vehicles. Nitrogen was used as the carrier gas.

Figure 8:
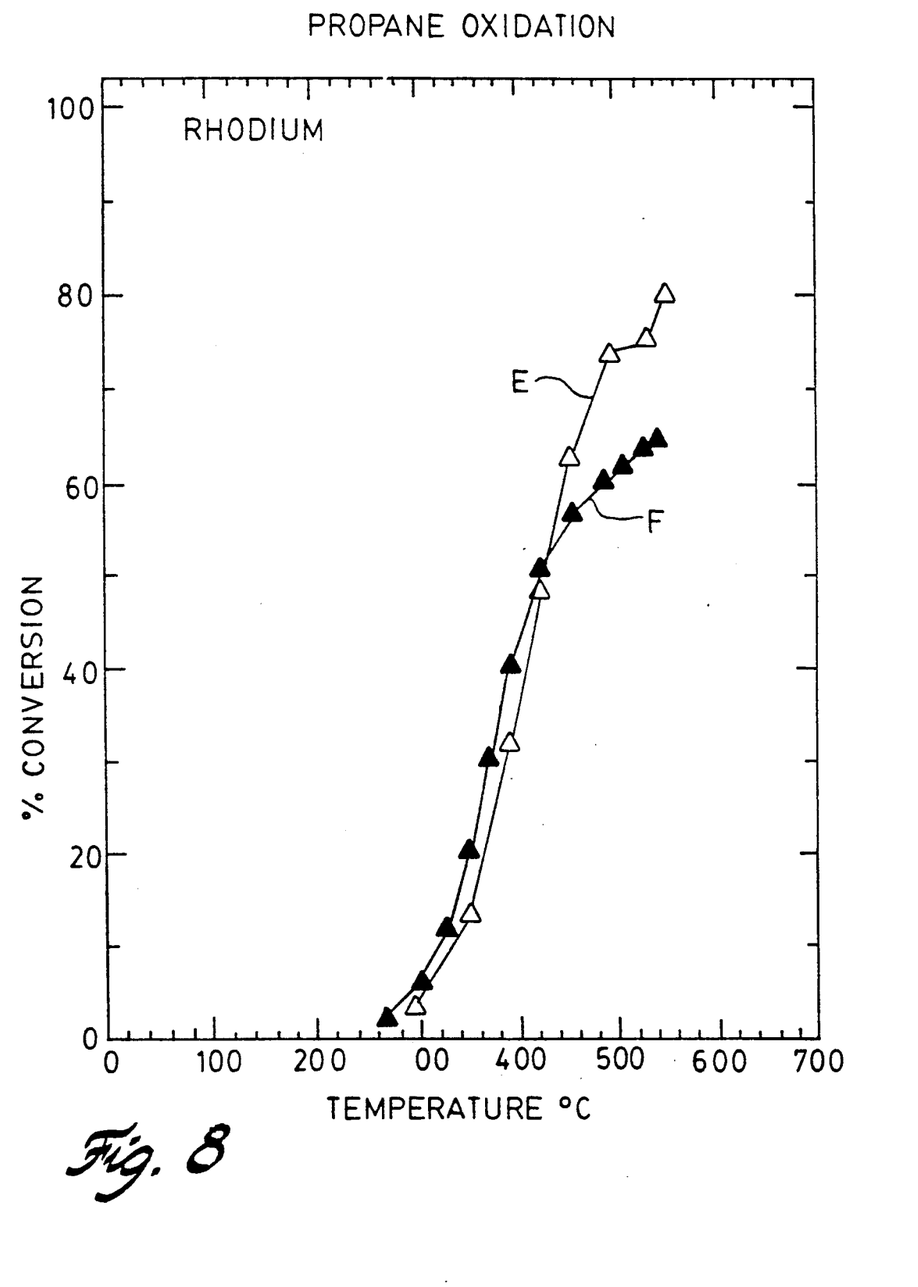
FIGS. 8-9 are similar graphical illustrations demonstrating the light-off temperature for an Rh-based catalyst, prepared in accordance with this invention, for propane oxidation and nitrous oxide reduction, respectively.
Figure 9:
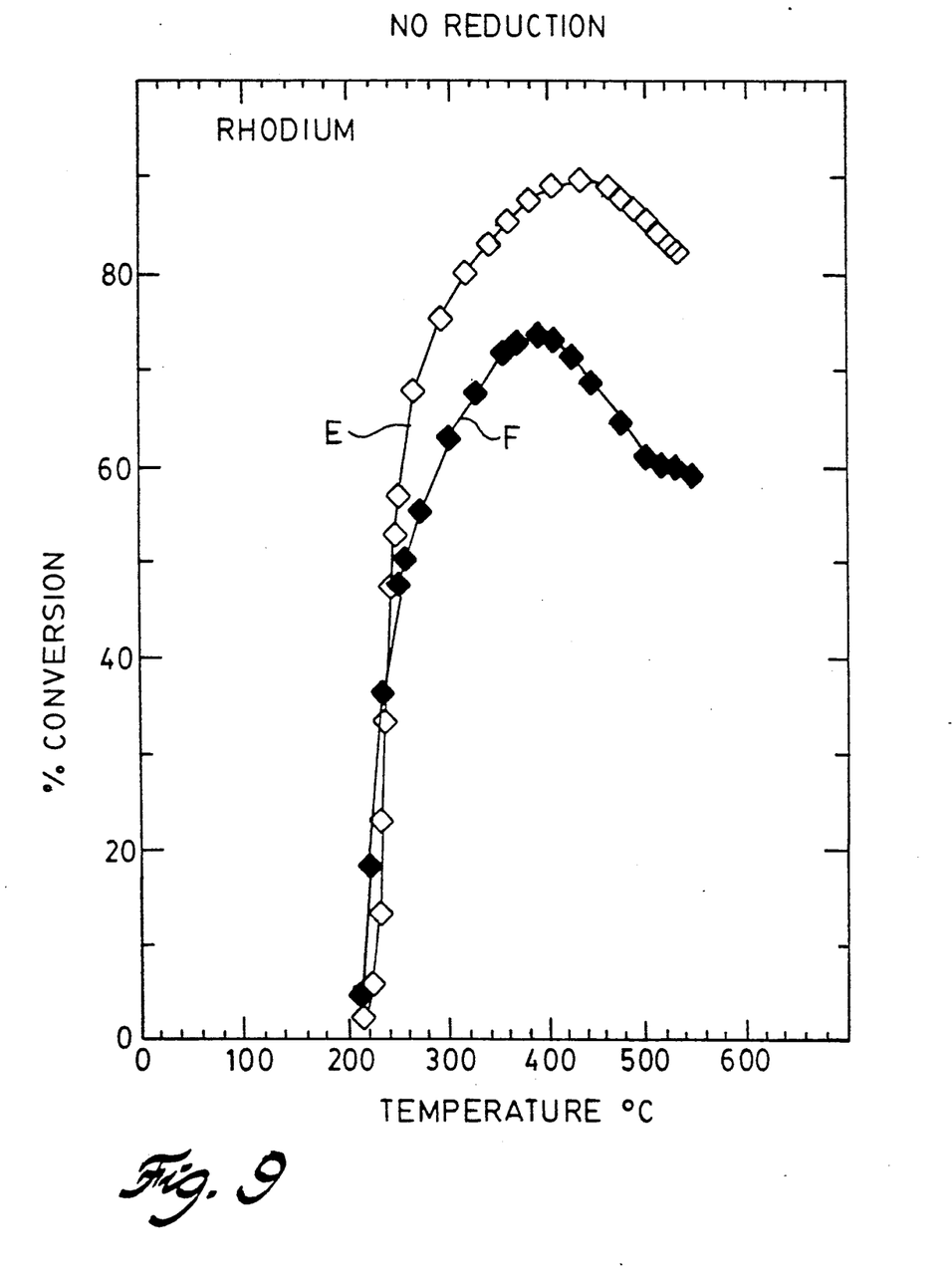

The light-off curves for propane oxidation and nitric oxide reduction are shown in FIGS. 8 and 9 respectively. Comparison of light-off temperatures (temperature corresponding to 50% conversion) and maximum conversion values indicates that the sample prepared using acetic acid as a modifier (catalyst E) is more active than the conventional $Rh/Al_2O_3$ catalyst (catalyst F) in NO reduction and propane oxidation.

The dissolution and readsorption of $Al^{+3}$ is observed when $Al_2O_3$ is brought in contact with highly acidic solutions equivalent to those used in this study. Since the extent of alumina dissolution is a function of the pH of the solution it is in contact with, it may be concluded that the amount of dissolved and reabsorbed would be higher in the case of catalyst E. Auxiliary flow reactor experiments were conducted on $Rh/Al_2O_3$ catalysts prepared by the addition of aluminum nitrate to the rhodium nitrate impregnation solution. These latter experiments showed that an increase in the $Al^{+3}$ concentration in the impregnation solution did not result in an increase in the activity of the $Rh/Al_2O_3$ catalyst. This suggests that the differences in the activity of these catalysts must be explained in terms of the morphological differences (i.e., crystal size distribution and exposed metal surface area) resulting from the use of acetic acid.

Figure 10:
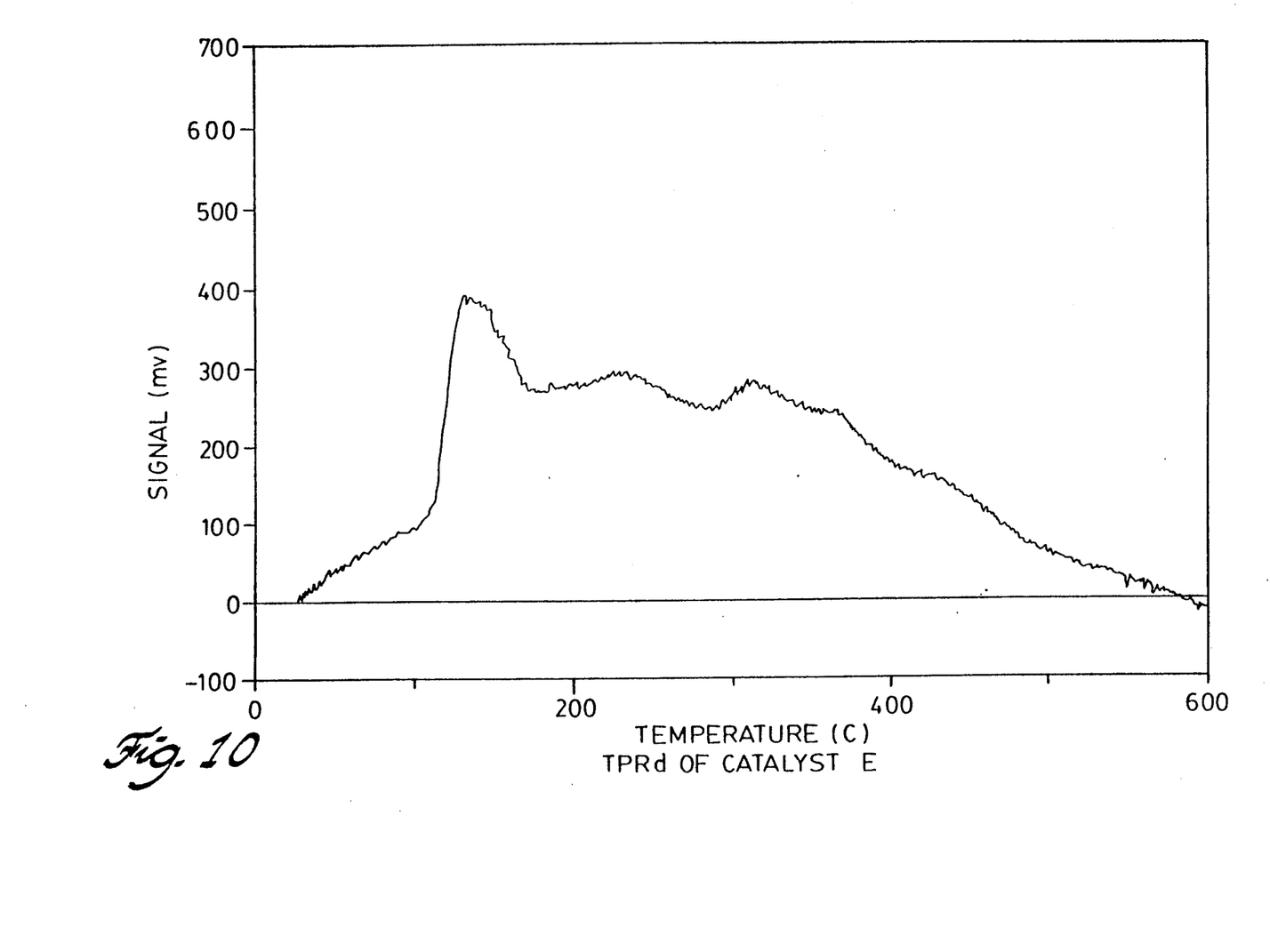
FIGS. 10-11 are graphical illustrations of TPRd signal strength as a function of temperature for catalysts E and F, respectively.
Figure 11:
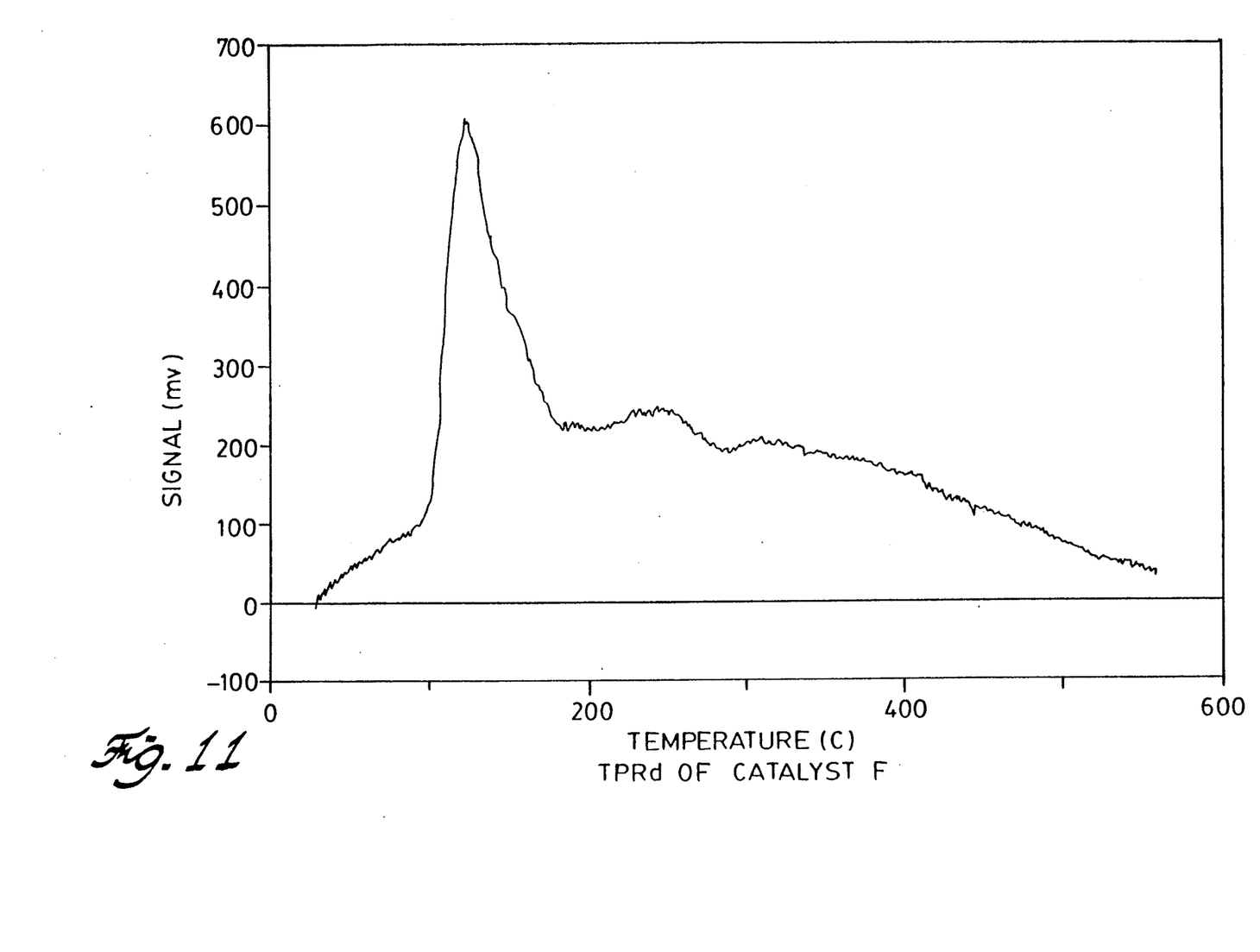

The TPRd results for catalysts E and F are shown in FIGS. 10 and 11. The peak temperatures, hydrogen consumption under individual peaks, and the $H_2/Rh$ ratios are presented in Table II. The peak at approximately 110° C. corresponds to the reduction of $Rh_2O_3$. Also, a $H_2/Rh$ ratio of less than 1.5 indicates that the fraction of $Rh_2O_3$ remains unreduced during TPRd. These considerations indicate that the use of acetic acid (catalyst E) result in a catalyst having a larger fraction of Rh distributed as crystalline $Rh_2O_3$.

TABLE II

| Catalyst E | |
|---|---|
| Peak temperatures (C.): 136,225,315 | |
| Hydrogen consumed ($\mu$moles/g. catalyst) | |
| Total: | 275.4 |
| Peak #1: | 109.1 |
| Peak #2: | 63.2 |
| Peak #3: | 103.1 |
| $H_2/Rh$ ratio: | 1.42 |

| Catalyst F | |
|---|---|
| Peak temperatures (C.): 123,243,308 | |
| Hydrogen consumed ($\mu$moles/g. catalyst) | |
| Total: | 254.6 |
| Peak #1: | 61.5 |
| Peak #2: | 79.29 |
| Peak #3: | 113.2 |
| $H_2/Rh$ ratio: | 1.31 |

The samples were also embedded in catalyzed methylmethacrylate and microtome sectioned. Xylene was used to dissolve the polymerized methacrylate from the thin section supported on carbon film substrates. The samples were analyzed using a JOEL 2000 FX transmission electron microscope at 200 KeV. The TEM photographs of the catalyst, as depicted in FIG. 1, illustrate the crystal size distribution which is comprised of small and large particles nested within a given volume. Additional examination using x-ray photoelectron spectroscopy was carried out to determine the palladium/alumina ratios. The binding energy of 336.5 eV indicates the presence of palladium oxide. The higher palladium/alumina ratio in catalyst A indicates that the amount of palladium present at the alumina surface is higher compared to that present in catalyst B. This implies that the catalytically active species present in the case of the Pd/alumina catalyst is actually PdO. Thus, it is believed that the acetic acid is a pH modifier and complexing agent and results in palladium catalysts with a wider crystal size distribution (bimodal), and the architecture of the particles is considered to be raft-like which Promotes higher activity in the catalyst for hydrocarbon oxidation and nitric oxide reduction reactions.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:
1. A method of making a three-way catalyst based on platinum group based metals, comprising:
   (a) impregnating an alumina substrate by incipient wetness with a platinum group metal ion by contacting such substrate with an aqueous solution containing the platinum group metal ion in an amount of 1-5% by weight of alumina substrate and a water soluble acid RCOOH with R being an alkyl, aryl, substituted alkyl or substituted aryl, said acid being present in an amount of 10-120% by weight of alumina substrate, the pH of said solution being less than 4.0; and (b) drying and calcining said incipiently wetted substrate.

2. The method as in claim 1, in which said incipient wetness impregnation is carried out by wetting the alumina substrate with a solution containing a platinum group metal and a carboxylic acid, said platinum group metal ion being present in said solution in an amount of 1-3%.

3. The method as in claim 1, in which said drying is carried out at a temperature of 373° K. for a period of one hour, and said calcining is carried out at a temperature of 873° K. for a period of 12 hours.

4. The method as in claim 1, in which the ratio of acetic acid to platinum group metal ion is in the range of 10-500.

5. A platinum group metal three-way catalyst having enhanced catalytic activity and prepared by the method of claim 1, comprising:

(a) an alumina substrate; and
(b) a platinum group metal impregnation layer thereover, said impregnation layer being comprised of raft-like particle structures and having a dispersion density characterized by small and large particles nested within a given volume.

* * * * *